United States Patent
Lai et al.

(10) Patent No.: US 8,524,408 B2
(45) Date of Patent: Sep. 3, 2013

(54) STACK OPERATION METHOD AIMED AT CELL REVERSAL PREVENTION

(75) Inventors: Yeh-Hung Lai, Webster, NY (US); Pinkhas A. Rapaport, Penfield, NY (US); Amit Nayar, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1000 days.

(21) Appl. No.: 12/567,438

(22) Filed: Sep. 25, 2009

(65) Prior Publication Data

US 2011/0076581 A1   Mar. 31, 2011

(51) Int. Cl.
*H01M 8/04* (2006.01)
*H01M 8/02* (2006.01)
(52) U.S. Cl.
USPC ............................ 429/430; 429/431; 429/432
(58) Field of Classification Search
USPC ....................................................... 429/430
See application file for complete search history.

(56) References Cited

U.S. PATENT DOCUMENTS

| | | | |
|---|---|---|---|
| 6,495,277 B1 * | 12/2002 | Edlund et al. | 429/411 |
| 2004/0091759 A1 * | 5/2004 | Harrington et al. | 429/22 |
| 2004/0175598 A1 * | 9/2004 | Bliven et al. | 429/12 |
| 2006/0263653 A1 * | 11/2006 | Sinha et al. | 429/13 |
| 2008/0102326 A1 * | 5/2008 | Falta | 429/13 |

* cited by examiner

*Primary Examiner* — Basia Ridley
*Assistant Examiner* — Caitlin Wilmot
(74) *Attorney, Agent, or Firm* — John A. Miller; Miller IP Group, PLC

(57) ABSTRACT

A method for preventing a fuel cell voltage potential reversal including determining a relationship between the cell resistance and the current of a fuel cell stack at which a fuel cell voltage potential reversal will occur, operating the fuel cell stack according to a power demand requested, and determining the maximum cell resistance of the fuel cells in the stack. If the maximum cell resistance exceeds a threshold value for the current at which the fuel cell stack is being operated, the operation of the fuel cell stack is restricted to prevent the fuel cell voltage potential from reversing.

17 Claims, 5 Drawing Sheets

STACK OPERATION METHOD AIMED AT CELL REVERSAL PREVENTION

BACKGROUND OF THE INVENTION

1. Field of the Invention

This invention relates generally to a method for preventing fuel cell voltage potential reversals and, more particularly, to a method for preventing fuel cell shorting due to fuel cell voltage potential reversals by preventing stack power demands from over-drying the fuel cell membranes.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated at the anode catalyst to generate free protons and electrons. The protons pass through the electrolyte to the cathode. The protons react with the oxygen and the electrons at the cathode catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode electrodes, or catalyst layers, typically include finely divided catalytic particles, usually platinum (Pt), supported on carbon particles and mixed with an ionomer. The catalytic mixture is deposited on opposing sides of the membrane either coated directly on the membrane or on the anode and cathode diffusion media respectively. The combination of the anode catalytic mixture, the cathode catalytic mixture and the membrane define a membrane electrode assembly (MEA). Each MEA is usually sandwiched between two sheets of porous material, the gas diffusion layer (GDL), that protects the mechanical integrity of the membrane and also helps in uniform reactant and humidity distribution. MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. The fuel cell stack also receives an anode hydrogen input gas that flows into the anode side of the stack. Not all of the oxygen is consumed by the stack and some of the air is output as a cathode exhaust gas that may include water as a by-product of the chemical reaction taking place in the stack.

The fuel cell stack includes a series of bipolar plates positioned between the several MEAs in the stack, where the bipolar plates and the MEAs are positioned between two end plates. The bipolar plates include anode side and cathode side flow distributors, or flow fields, for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The membrane within a fuel cell needs to have a certain water content so that the ionic resistance across the membrane is low enough to effectively conduct protons. Membrane humidification may come from the stack water by-product or external humidification. The flow of reactants through the flow channels of the stack has a drying effect on the cell membranes, most noticeably at an inlet of the reactant flow. However, the accumulation of water droplets within the flow channels could prevent reactants from flowing therethrough, and may cause the cell to fail because of low reactant gas flow, thus affecting stack stability. The accumulation of water in the reactant gas flow channels, as well as within the GDL, is particularly troublesome at low stack output loads.

As mentioned above, water is generated as a by-product of the stack operation. Therefore, the cathode exhaust gas from the stack will typically include water vapor and liquid water. It is known in the art to use a water vapor transfer (WVT) unit to capture some of the water in the cathode exhaust gas, and use the water to humidify the cathode input airflow. Water in the cathode exhaust gas at one side of the water transfer elements, such as membranes, is absorbed by the water transfer elements and transferred to the cathode air stream at the other side of the water transfer elements.

High frequency resistance (HFR) is a well-known property of fuel cells, and is closely related to the ohmic resistance, or membrane protonic resistance, of the fuel cell membrane. Ohmic resistance is itself a function of the degree of fuel cell membrane humidification. Therefore, by measuring the HFR of the fuel cell stack membranes within a specific band of excitation current frequencies, the degree of humidification of the fuel cell membrane may be determined. Other methods for determining ohmic resistance, such as current interruption methods, impedance spectroscopy, and/or estimations based on temperature and relative humidity may be used to determine cell resistance.

Proton exchange membranes (PEMs) typically have a higher proton conductivity at an elevated hydration state, which makes it desirable to run fuel cell stacks at a higher level of membrane humidification. However, as discussed above, a membrane that is too wet may cause problems due to water accumulation within the gas flow channels and, during low temperature environments, freezing of the water in the fuel cell stack may produce ice that blocks flow channels thereby affecting system restarts. Therefore, it is typically more advantageous to operate the fuel cell stack with low membrane humidity to reduce the system cost and complexity, and to enable better freeze start performance, despite the fact that membranes that are too dry may have too low of an electrical conductivity which may cause the fuel cell stack to short circuit.

One of the risks associated with operating a fuel cell stack at a lower level of membrane humidity is the possibility of fuel cell voltage potential reversal, referred to as negative cell potentials, where the polarity of the fuel cell reverses. Cell reversals may lead to cell shorting and pinhole formation in the fuel cell membrane, which in turn may lead to failure of the fuel cell and a safety concern. Because the fuel cells are usually electrically coupled in series, if one of the fuel cells stops performing, the entire fuel cell stack may stop performing. Thus, it is important to ensure that a fuel cell stack is not operated too dry.

It is known in the art to implement procedures to protect fuel cell stacks from excessively dry operation, such as during the initial stages of freeze starts. While these methods work in most cases, the current ramp rate limits, i.e., the rate of voltage increase or decrease that the fuel cell can safely perform given the humidification level of the cell, are empirical and can be arbitrary. Thus, current ramp rate limits may be too conservative and may not safely cover all the possible scenarios such as when the fuel cell system coolant temperature exceeds normal operating temperatures due to faulty coolant temperature sensors. Therefore, there is a need in the art for a more robust method for operating a fuel cell stack under relatively dry conditions to prevent fuel cell reversals from occurring.

SUMMARY OF THE INVENTION

In accordance with the teachings of the present invention, a method for preventing a fuel cell voltage potential reversal is disclosed that includes determining a relationship between the cell resistance and the current of a fuel cell stack at which a fuel cell voltage potential reversal will occur, operating the fuel cell stack according to a power demand requested, and determining the maximum high cell resistance of the fuel cells in the stack. If the maximum cell resistance exceeds a threshold value for the current at which the fuel cell stack is being operated, the operation of the fuel cell stack is restricted to prevent the fuel cell voltage potential from reversing.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for preventing fuel cell voltage potential reversals is merely exemplary in nature, and is in no way intended to limit the invention or its applications or uses.

Figure 1:
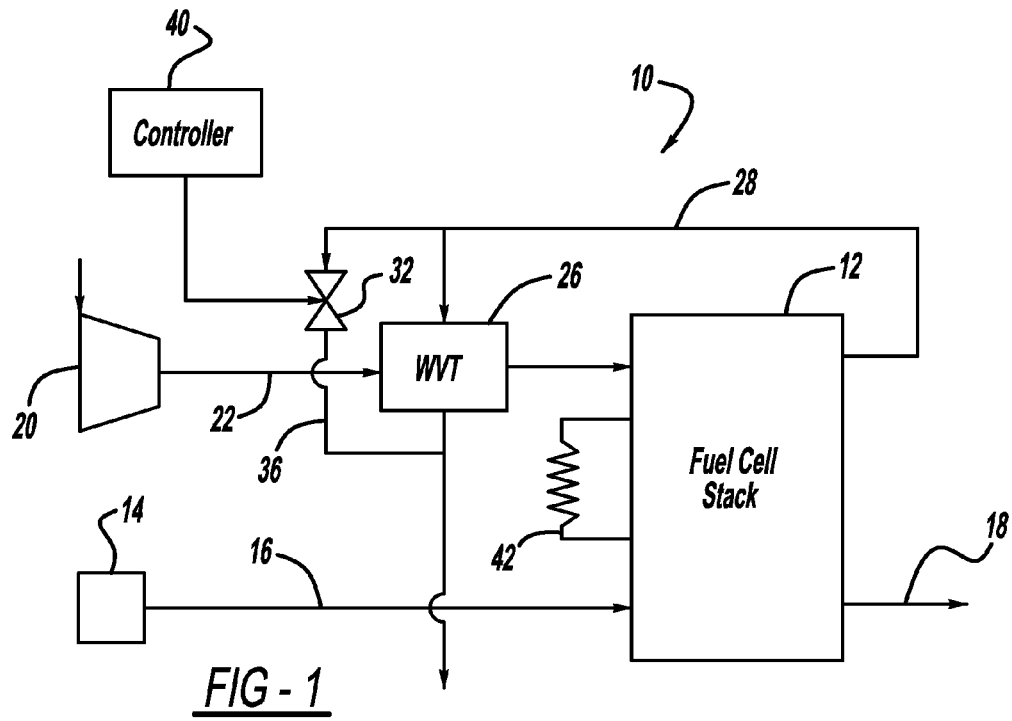
FIG. 1 is a schematic block diagram of a fuel cell system.

FIG. 1 is a schematic block diagram of a fuel cell system 10 including a fuel cell stack 12. The fuel cell stack 12 receives hydrogen from a hydrogen source 14 on anode input line 16 and provides an anode exhaust gas on line 18. A compressor 20 provides an air flow to the cathode side of the fuel cell stack 12 on cathode input line 22 through a water vapor transfer (WVT) unit 26 that humidifies the cathode input air. A cathode exhaust gas is output from the stack 12 on a cathode exhaust gas line 28. The cathode exhaust gas line 28 directs the cathode exhaust to the WVT unit 26 to provide the humidity to humidify the cathode input air. A by-pass line 36 is provided around the WVT unit 26 and a by-pass valve 32 is provided in the by-pass line 36 and is controlled to selectively redirect the cathode exhaust gas through or around the WVT unit 26 to provide the desired amount of humidity to the cathode input air. A controller 40 controls the by-pass valve 32 and the compressor 20.

A high frequency resistance (HFR) sensor 42 measures the HFR of the fuel cell stack 12, thereby allowing the cell membrane humidification level of the fuel cell stack 12 to be determined by the controller 40.

Figure 2:
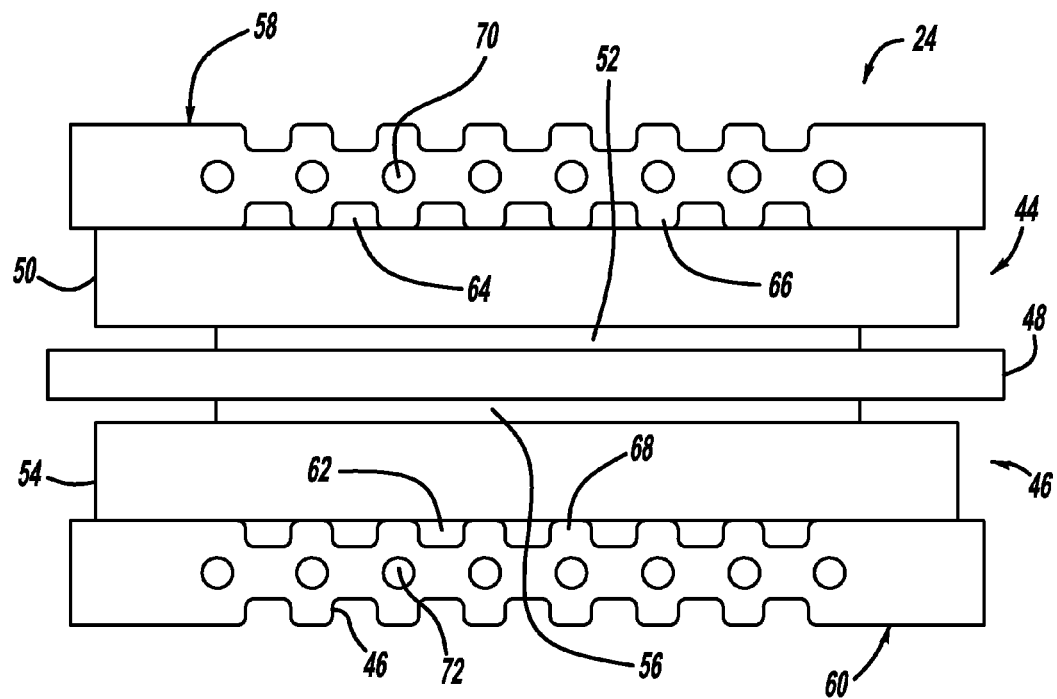
FIG. 2 is a cross-sectional view of a fuel cell.

FIG. 2 is a cross-sectional view of a fuel cell 24 that is part of a fuel cell stack of the type discussed above. The fuel cell 24 includes a cathode side 44 and an anode side 46 separated by an electrolyte membrane 48. A cathode side diffusion media layer 50 is provided on the cathode side 44, and a cathode side catalyst layer 52 is provided between the membrane 48 and the diffusion media layer 50. Likewise, an anode side diffusion media layer 54 is provided on the anode side 46, and an anode side catalyst layer 56 is provided between the membrane 48 and the diffusion media layer 54. The catalyst layers 52 and 56 and the membrane 48 define an MEA. The diffusion media layers 50 and 54 are porous layers that provide for input gas transport to and water transport from the MEA. Various techniques are known in the art for depositing the catalyst layers 52 and 56 on the diffusion media layers 50 and 54, respectively, or on the membrane 48.

A cathode side flow field plate or bipolar plate 58 is provided on the cathode side 44 and an anode side flow field plate or bipolar plate 60 is provided on the anode side 46. The bipolar plates 58 and 60 are provided between the fuel cells in the fuel cell stack. A hydrogen reactant gas flow from flow channels 62 in the bipolar plate 60 reacts with the catalyst layer 56 to dissociate the hydrogen ions and the electrons. Air flow from flow channels 64 in the bipolar plate 58 reacts with the catalyst layer 52. The hydrogen ions are able to propagate through the membrane 48 where they electro-chemically react with the oxygen in the airflow and the return electrons in the catalyst layer 52 to generate water as a by-product. The bipolar plate 58 includes lands 66 between the flow channels 64 and the bipolar plate 60 includes lands 68 between the flow channels 62. Cooling fluid flow channels 70 are provided in the bipolar plate 58 and cooling fluid flow channels 72 are provided in the bipolar plate 60.

When a negative cell potential occurs in the fuel cell 24, the polarity of the fuel cell 24 reverses, typically causing an elevated negative potential which generates heat and may damage the membrane 48 within the fuel cell 24. If the membrane 48 is damaged, membrane pinholes may develop and result in gas cross-over failure in the cell 24. Furthermore, the diffusion media layers 50 and 54 on each side of the membrane 48 may come into contact with each other, causing a short and further elevated negative potential and more heat to be generated, thus leading to more damage. Therefore, a method for preventing such negative fuel cell voltage potentials from occurring is needed to preserve the functionality of the fuel cell 24 within a fuel cell stack.

Figure 3A:
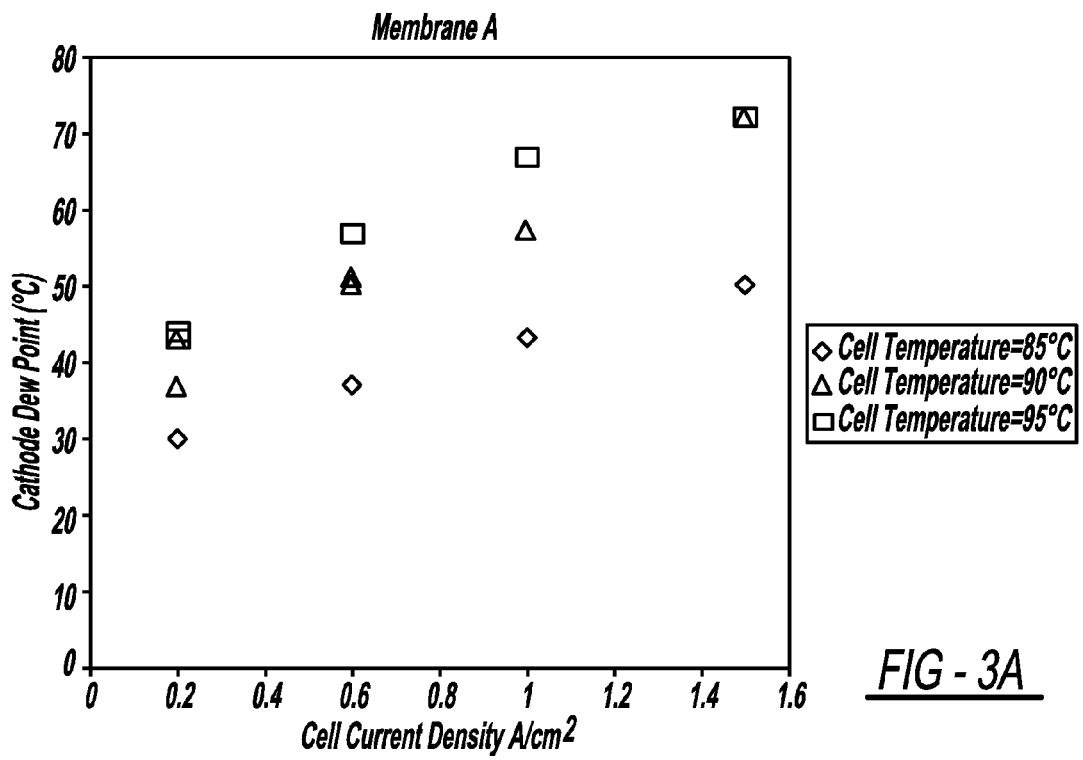
FIGS. 3A and 3B are graphs with cell current density on the x-axis and cathode dew point on the y-axis.
Figure 3B:
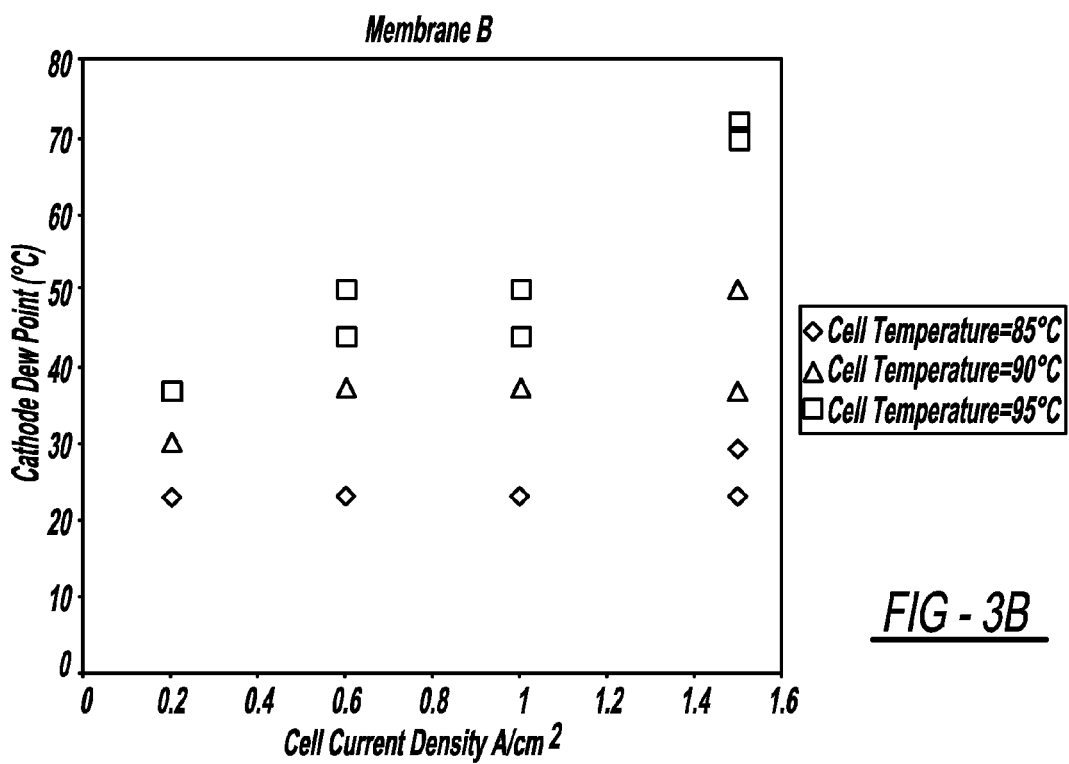

A series of tests have been conducted to investigate fuel cell voltage reversal behavior using two different types of membranes, membrane A and membrane B, using specific fuel cell architectures and hardware to eliminate other variables. FIGS. 3A and 3B are graphs with cell current density on the x-axis and inlet cathode dew point on the y-axis and illustrate that there are critical dew points where cell reversals occur for membrane A and membrane B, respectively. FIG. 3B illustrates that membrane B has a lower critical cathode dew point for most stack current densities and cell temperatures, suggesting that membrane B may have a wider operational window. In addition, FIGS. 3A and 3B illustrate that at higher stack current densities or cell temperatures, voltage potential reversals of the fuel cell 24 may happen at higher dew points, i.e., higher humidity. This suggests that as current density or cell temperature increases, the window of safe operation without the risk of a cell voltage potential reversal becomes narrower. The HFR is also measured when a cell voltage potential reversal occurs during the series of tests described above, which is discussed in more detail below. As will be readily apparent to those skilled in the art, HFR is merely one way of determining ohmic resistance, and other methods such as current interruption methods, impedance spectroscopy and/or estimations based on temperature and relative humidity may be used to determine cell resistance without departing from the scope of the present invention.

Although FIGS. 3A and 3B illustrate that membranes A and B, respectively, have significantly different operating windows, it is noteworthy that the critical cell HFR thresholds when a cell voltage potential reversal will occur for the corresponding current densities are quite similar regardless of the cell temperatures or the different dew point thresholds as seen in FIGS. 3A and 3B. Therefore, a relationship surprisingly exists between HFR and current density. Thus, by monitoring cell resistance a strategy for determining a safe operating window of a fuel cell or a fuel cell stack may be used to limit extreme membrane dry out at various current densities which will in turn limit fuel cell reversals. The method for limiting fuel cell reversals is described in more detail below, using HFR to monitor cell resistance.

Figure 4A:
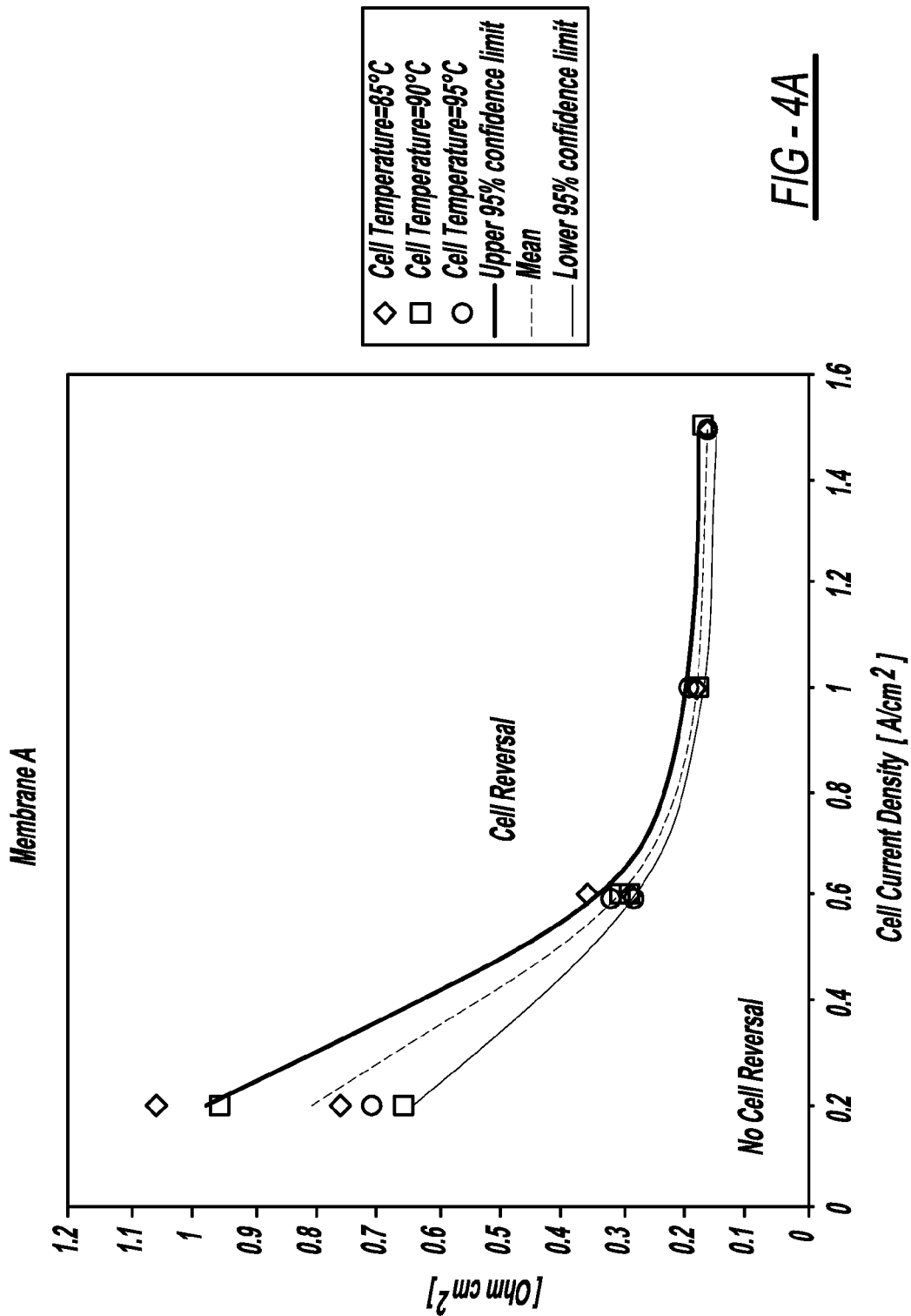
FIGS. 4A and 4B are graphs with cell current density on the x-axis and HFR on the y-axis.
Figure 4B:
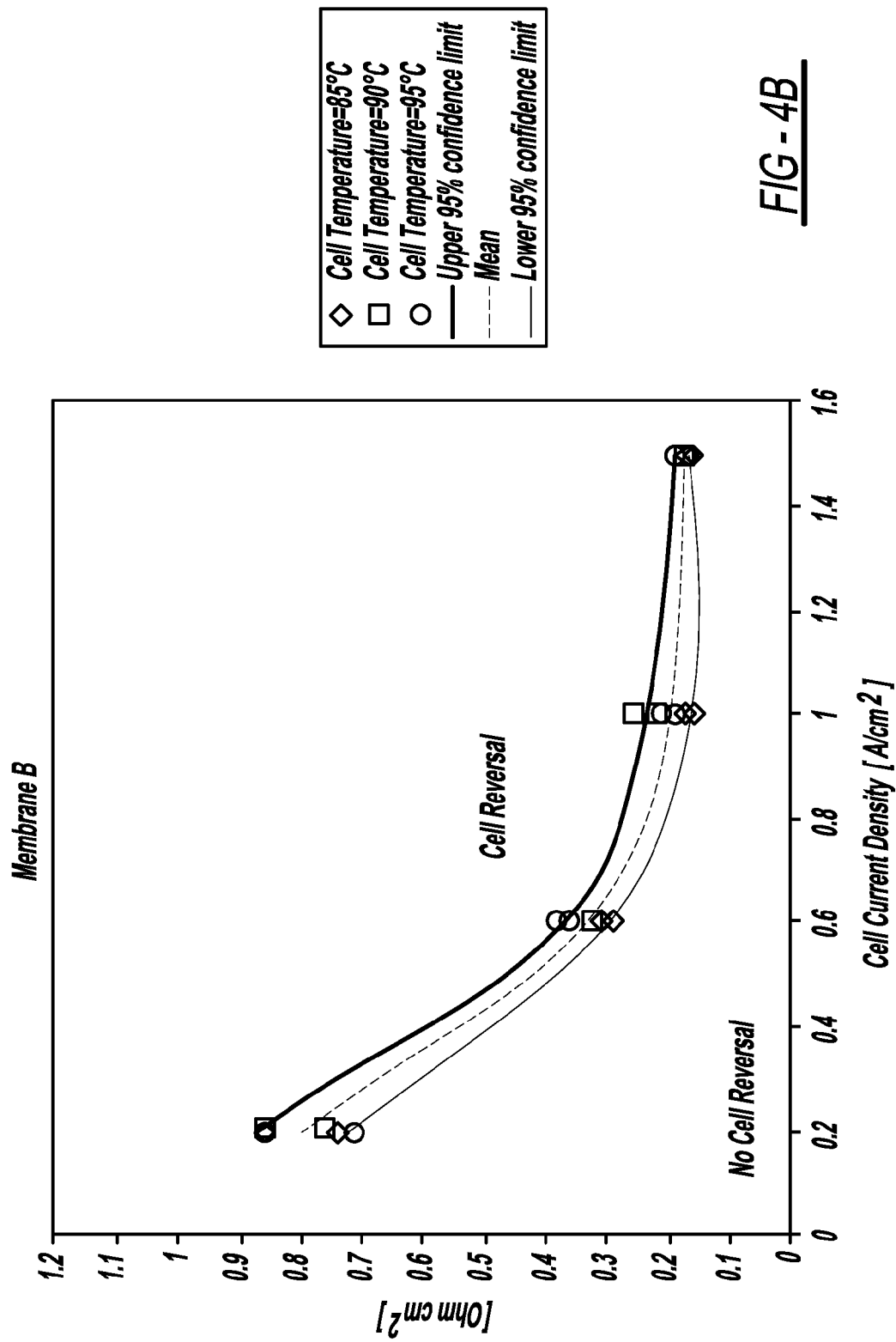

FIGS. 4A and 4B are graphs with cell current density on the x-axis and HFR on the y-axis, and suggest that HFR can be an effective indicator of the occurrence of cell reversals. More specifically, if the combination of the HFR and the current density in FIGS. 4A and 4B are located in the area below the curves of FIGS. 4A and 4B, i.e., the "No Cell Reversal" region, it is expected that the fuel cell voltage potential reversal will not occur. On the other hand, if the combination of the HFR and the current density is located in the area above the curves of FIGS. 4A and 4B, i.e., the "Cell Reversal" region, it is expected that the fuel cell voltage potential reversal will occur, increasing the probability that a sudden end of life of the fuel cell stack 12 due to shorting will occur. Therefore, a method for operating a fuel cell stack within the "No Cell Reversal" region has been developed based on the series of tests illustrated in FIGS. 3A, 3B, 4A and 4B, which is described in detail below.

Figure 5:
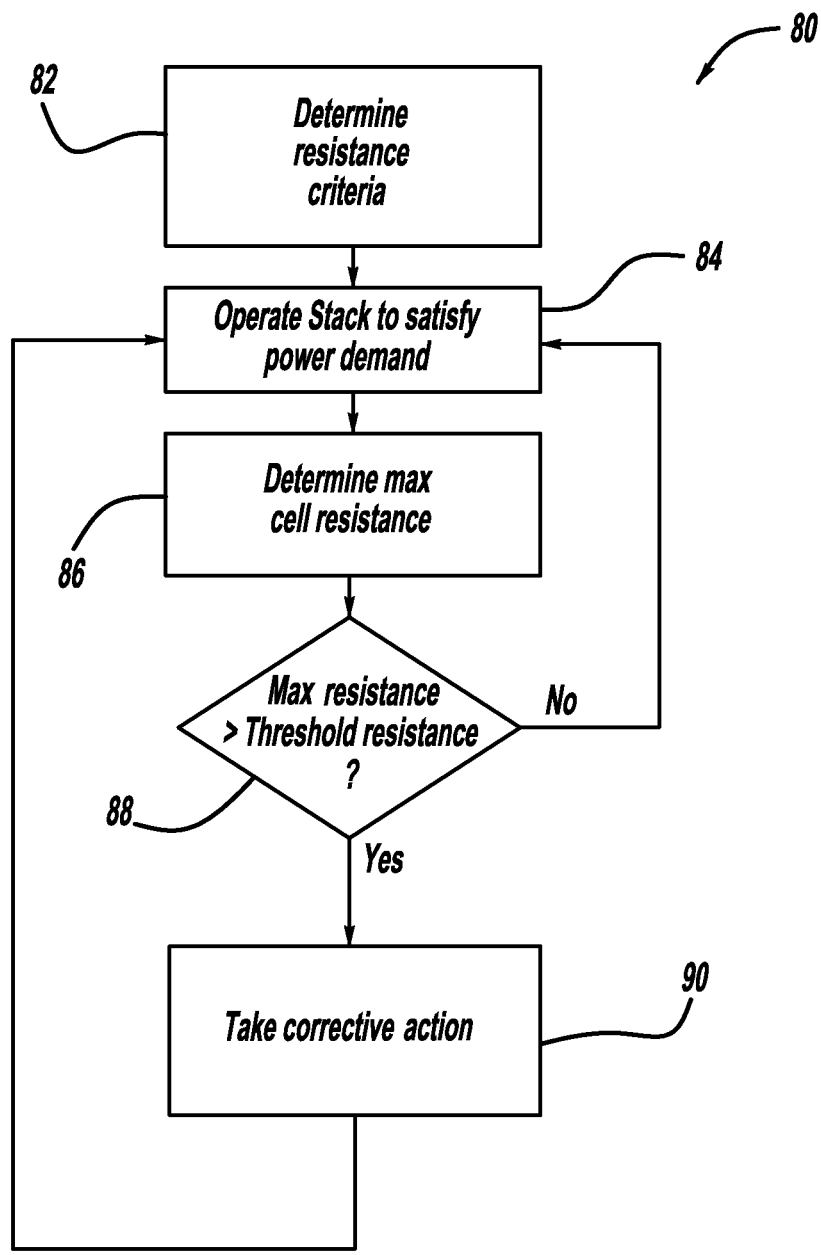
FIG. 5 is a flow diagram of the method for preventing fuel cell stack reversals.

FIG. 5 is a flow chart 80 showing a method for preventing fuel cell stack voltage potential reversals. One having skill in the art will readily recognize that the described invention applies to both an individual fuel cell as well as a plurality of fuel cells, such as the fuel cell stack 12.

The first step at box 82 is to determine a resistance criterion, which is the relationship between the high frequency resistance and current density at which the fuel cell voltage potential reversal may occur for the predetermined type of membrane 48 used in the stack 12. Utilizing the data collected from testing, such as the data illustrated in FIGS. 3A, 3B, 4A and 4B, an HFR criterion is established and stored in non-volatile memory of the controller 40 for the fuel cell stack 12 for the predetermined membrane 48 operating at a variety of current densities, dew points and temperatures. Fuel cell resistance is typically determined by measuring HFR using the HFR sensor 42, however, other methods of determining the resistance of the fuel cell stack 12 may be utilized without departing from the scope of the invention, as described in more detail below. Also described below, the HFR of each individual fuel cell of the stack may be measured or estimated, or the average HFR of the fuel cell stack 12 may be measured or estimated.

The next step at box 84 is to operate the fuel cell stack 12 according to the power demand requested. Once the stack 12 is operating according to the power demand requested, the maximum high frequency resistance of the fuel cells in the stack 12 is determined at box 86. The present invention contemplates three ways to determine the maximum high frequency resistance of the fuel cells in the fuel cell stack 12. In a first embodiment, the high frequency resistance of each fuel cell is measured and the maximum fuel cell high frequency resistance is determined. In a second embodiment, the high frequency resistance of each fuel cell is estimated based on model calculations using the measured voltage of each fuel cell and the maximum fuel cell high frequency resistance is determined. In a third embodiment, the HFR of the stack is measured and a look-up table is employed to estimate the maximum fuel cell high frequency resistance using current stack operating conditions, as is known to those skilled in the art. Other ways to determine maximum fuel cell high frequency resistance may be employed without departing from the scope of the present invention.

Once the maximum high frequency resistance of the fuel cells in the stack 12 is determined, the next step at decision diamond 88 is to determine if the maximum fuel cell high frequency resistance exceeds a threshold high frequency resistance, which is based on the resistance criterion established at the box 82. Typically, a high frequency resistance safety margin is added to the maximum high frequency resistance that is measured or estimated at box 86 and compared with the resistance criterion established at the box 82 to ensure that the fuel cell high frequency resistance does not allow a voltage potential reversal to occur. If the resistance, as monitored at the box 86, does not exceed the threshold high frequency resistance established according to the resistance criterion at the box 82, then no restriction is imposed on how the stack 12 is operated at the decision diamond 88 and the algorithm returns to the box 84 and operates according to the power demand requested.

If, however, the measured or estimated maximum high frequency resistance does exceed the threshold high frequency resistance established according to the resistance criterion at the box 82, the decision diamond 88 determines that restriction on the operation of the stack 12 is required, which occurs at box 90. A variety of corrective measures may be taken at the box 90 including reducing the current density or reducing the fuel cell stack resistance by increasing the stack relative humidity. Once the appropriate restrictive action is taken at the box 90, the algorithm returns to the box 84 and allows the fuel cell stack 12 to satisfy the power demand. The method as described herein may be continuously employed or periodically employed during operation of the fuel cell stack 12.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for preventing a voltage potential reversal of a fuel cell in a fuel cell stack, said method comprising:
   determining a relationship between high frequency resistance and stack current density at which a fuel cell voltage potential reversal will occur for a predetermined type of membrane used in the fuel cells of the fuel cell stack;
   operating the fuel cell stack according to a power demand requested;
   determining the maximum cell resistance of the fuel cells in the stack;
   determining if the maximum cell resistance exceeds a predetermined cell resistance threshold value for the current at which the fuel cell stack is being operated where the predetermined cell resistance threshold value is based on the determined relationship between cell resistance and cell current at which a fuel cell voltage potential reversal will occur;

adding a safety margin when determining if the maximum cell resistance of the fuel cells in the stack exceeds a threshold value for the current at which the fuel cell stack is being operated so as to ensure a reversal of the voltage potential of one or more of the fuel cells in the stack does not occur; and restricting the operation of the fuel cell stack by reducing the current if the maximum cell resistance exceeds the predetermined cell resistance threshold value.

2. The method according to claim 1 wherein determining the relationship between the cell resistance and the stack current of the fuel cell at which a fuel cell voltage potential reversal will occur includes storing the determined relationship in a controller.

3. The method according to claim 1 wherein determining the maximum cell resistance of the fuel cells includes measuring the cell resistance of each cell in the stack and determining the maximum fuel cell resistance from the measured cell resistance of each cell.

4. The method according to claim 1 wherein determining the maximum cell resistance of the fuel cells includes estimating the cell resistance of each fuel cell using a measured voltage of the fuel cell and determining the maximum fuel cell resistance from the estimated cell resistance of each cell.

5. The method according to claim 1 wherein determining the maximum cell resistance of the fuel cells includes measuring the cell resistance of the stack and utilizing a look-up table to determine the maximum fuel cell resistance for the current stack operating conditions.

6. The method according to claim 1 wherein the fuel cell stack continues to operate according to the power demand requested and continues to be monitored if the determined maximum cell resistance does not exceed the predetermined threshold value for the current at which the fuel cell is being operated.

7. The method according to claim 1 further comprising returning the fuel cell stack to normal operation after restricting the operation once a threshold period of time has elapsed.

8. The method according to claim 1 further comprising returning the fuel cell stack to normal operation after restricting the operation of the stack once the cell resistance drops below a threshold value.

9. A method for preventing a fuel cell voltage potential reversal, said method comprising:

determining a relationship between cell resistance and cell current at which a fuel cell voltage potential reversal will occur for a predetermined type of membrane used in the fuel cell;

operating the fuel cell according to a power demand requested;

determining the cell resistance of the fuel cell;

determining if the cell resistance of the fuel cell exceeds a predetermined threshold value for the current at which the fuel cell is operated;

adding a safety margin when determining if the cell resistance of the fuel cell exceeds a threshold value for the current at which the fuel cell is being operated so as to ensure a reversal of the voltage potential of the cell does not occur; and restricting the operation of the fuel cell so as to prevent the fuel cell voltage potential from reversing.

10. The method according to claim 9 wherein determining the cell resistance of the fuel cell includes measuring the cell resistance of the fuel cell.

11. The method according to claim 9 wherein determining the cell resistance of the fuel cell includes estimating the cell resistance of the fuel cell based on model calculations.

12. A method for preventing a fuel cell voltage potential reversal of a fuel cell in a fuel cell stack, said method comprising:

determining a relationship between cell resistance and stack current at which a fuel cell voltage potential reversal will occur for a predetermined type of membrane used in the fuel cells of the fuel cell stack;

operating the fuel cell stack according to a power demand requested;

determining the maximum cell resistance of the fuel cells in the stack;

determining if the maximum cell resistance exceeds a predetermined cell resistance threshold value for the current at which the fuel cell stack is being operated, where the predetermined cell resistance threshold value is based on the determined relationship between cell resistance and cell current at which a fuel cell voltage potential reversal will occur;

adding a safety margin when determining if the cell resistance of the fuel cells in the stack exceeds a threshold value for the current at which the fuel cell is being operated so as to ensure a reversal of the voltage potential of one or more of the fuel cells in the stack does not occur; and increasing the relative humidity and decreasing the current density of the fuel cell if the threshold value for cell resistance has been exceeded to prevent a reversal of the fuel cell voltage potential.

13. The method according to claim 12 wherein determining the relationship between the cell resistance and the current at which a fuel cell voltage potential reversal will occur includes storing the determined relationship in a controller.

14. The method according to claim 13 wherein the determined relationship stored in the controller depends on the type of membrane used in the fuel cell.

15. The method according to claim 12 wherein determining the cell resistance of the fuel cell includes measuring the cell resistance of each cell in the stack and determining the maximum fuel cell resistance from the measured cell resistance of each cell.

16. The method according to claim 12 wherein the determining the cell resistance of the fuel cell includes estimating the cell resistance of each fuel cell using a measured voltage of the fuel cell and determining the maximum fuel cell resistance from the estimated cell resistance of each cell.

17. The method according to claim 12 wherein determining the maximum cell resistance of the fuel cells includes measuring the cell resistance of the stack and utilizing a look-up table to determine the maximum fuel cell resistance for the current stack operating conditions.

* * * * *